US008473017B2

(12) United States Patent
Milosavljevic et al.

(10) Patent No.: US 8,473,017 B2
(45) Date of Patent: Jun. 25, 2013

(54) ADJUSTABLE ANTENNA AND METHODS

(75) Inventors: Zlatoljub Milosavljevic, Kempele (FI); Anne Isohätälä-Lehmikangas, Kello (FI); Jyrki Mikkola, Evijärvi (FI)

(73) Assignee: Pulse Finland Oy, Kempele (FI)

( * ) Notice: Subject to any disclaimer, the term of this patent is extended or adjusted under 35 U.S.C. 154(b) by 1213 days.

(21) Appl. No.: 12/082,882

(22) Filed: Apr. 14, 2008

(65) Prior Publication Data

US 2008/0266199 A1 Oct. 30, 2008

(30) Foreign Application Priority Data

Oct. 14, 2005 (FI) ..................................... 20055554
Feb. 15, 2006 (FI) ..................................... 20065116
Sep. 28, 2006 (FI) ..................... PCT/FI2006/050418

(51) Int. Cl.
*H04M 1/00* (2006.01)

(52) U.S. Cl.
USPC ......... 455/575.7; 455/78; 455/550.1; 455/69; 455/126; 455/271; 455/275; 343/754; 343/702; 343/722; 343/895; 343/893; 343/749

(58) Field of Classification Search
USPC ............ 455/78, 69, 126, 575.5, 575.7, 550.1, 455/271, 275; 343/895, 700 MS, 840, 754, 343/702, 893, 722, 749
See application file for complete search history.

(56) References Cited

U.S. PATENT DOCUMENTS 2,745,102 A 5/1956 Norgordon
3,938,161 A 2/1976 Sanford (Continued)

FOREIGN PATENT DOCUMENTS

CN 1316797 10/2007
DE 10015583 11/2000

(Continued)

OTHER PUBLICATIONS

"An Adaptive Microstrip Patch Antenna for Use in Portable Transceivers", Rostbakken et al., Vehicular Technology Conference, 1996, Mobile Technology for the Human Race, pp. 339-343.

(Continued)

*Primary Examiner* — Marceau Milord

(74) *Attorney, Agent, or Firm* — Gazdzinski & Associates, PC

(57) ABSTRACT

An adjustable monopole antenna especially intended for the mobile terminals. The adjusting circuit (930) of the antenna is located between the radiator (920) and the antenna port of a radio device and forms, together with the antenna feed conductor (901), a feed circuit. This circuit comprises an adjustable reactance between the feed conductor and the ground in series with the feed conductor or in both of those places. For example, the feed conductor can be connected by a multi-way switch to one of alternative transmission lines, which are typically short-circuited or open at their tail end and shorter than the quarter wave, each line acting for a certain reactance. The antenna operating band covers at a time only a part of the frequency range used by one or two radio systems, in which case the antenna matching is easier to arrange than of a real broadband antenna. The space required for both the radiator and the adjusting circuit is relatively small. There is no need to arrange a coupling to the radiator for the antenna adjusting, which means a simpler antenna structure and thus savings in production costs.

15 Claims, 5 Drawing Sheets

U.S. PATENT DOCUMENTS 4,004,228 A 1/1977 Mullett
4,028,652 A 6/1977 Wakino
4,031,468 A 6/1977 Ziebell
4,054,874 A 10/1977 Oltman
4,069,483 A 1/1978 Kaloi
4,123,756 A 10/1978 Nagata et al.
4,123,758 A 10/1978 Shibano et al.
4,131,893 A 12/1978 Munson et al.
4,201,960 A 5/1980 Skutta et al.
4,255,729 A 3/1981 Fukasawa et al.
4,313,121 A 1/1982 Campbell et al.
4,356,492 A 10/1982 Kaloi
4,370,657 A 1/1983 Kaloi
4,423,396 A 12/1983 Makimoto et al.
4,431,977 A 2/1984 Sokola et al.
4,546,357 A 10/1985 Laughon et al.
4,559,508 A 12/1985 Nishikawa et al.
4,584,709 A * 4/1986 Kneisel et al. .................. 455/78
4,625,212 A 11/1986 Oda et al.
4,653,889 A 3/1987 Bizouard et al.
4,661,992 A 4/1987 Garay et al.
4,692,726 A 9/1987 Green et al.
4,703,291 A 10/1987 Nishikawa et al.
4,706,050 A 11/1987 Andrews
4,716,391 A 12/1987 Moutrie et al.
4,740,765 A 4/1988 Ishikawa et al.
4,742,562 A 5/1988 Kommrusch
4,761,624 A 8/1988 Igarashi et al.
4,800,348 A 1/1989 Rosar et al.
4,800,392 A 1/1989 Garay et al.
4,821,006 A 4/1989 Ishikawa et al.
4,823,098 A 4/1989 DeMuro et al.
4,827,266 A 5/1989 Sato et al.
4,829,274 A 5/1989 Green et al.
4,862,181 A 8/1989 PonceDeLeon et al.
4,879,533 A 11/1989 De Muro et al.
4,896,124 A 1/1990 Schwent
4,954,796 A 9/1990 Green et al.
4,965,537 A 10/1990 Kommrusch
4,977,383 A 12/1990 Niiranen
4,980,694 A 12/1990 Hines
5,017,932 A 5/1991 Ushiyama et al.
5,047,739 A 9/1991 Kuokkanene
5,053,786 A 10/1991 Silverman et al.
5,097,236 A 3/1992 Wakino et al.
5,103,197 A 4/1992 Turunen
5,109,536 A 4/1992 Kommrusch
5,155,493 A 10/1992 Thursby et al.
5,157,363 A 10/1992 Puurunen
5,159,303 A 10/1992 Flink
5,166,697 A 11/1992 Viladevall et al.
5,170,173 A 12/1992 Krenz et al.
5,203,021 A 4/1993 Repplinger et al.
5,210,510 A 5/1993 Karsikas
5,210,542 A 5/1993 Pett et al.
5,220,335 A 6/1993 Huang
5,229,777 A 7/1993 Doyle
5,239,279 A 8/1993 Turunen
5,278,528 A 1/1994 Turunen
5,281,326 A 1/1994 Galla
5,298,873 A 3/1994 Ala-Kojola
5,302,924 A 4/1994 Jantunen
5,304,968 A 4/1994 Ohtonen
5,307,036 A 4/1994 Turunen
5,319,328 A 6/1994 Turunen
5,349,315 A 9/1994 Ala-Kojola
5,349,700 A 9/1994 Parker
5,351,023 A 9/1994 Niiranen
5,354,463 A 10/1994 Turunen
5,355,142 A 10/1994 Marshall et al.
5,357,262 A 10/1994 Blaese
5,363,114 A 11/1994 Shoemaker
5,369,782 A 11/1994 Kawano et al.
5,382,959 A 1/1995 Pett et al.
5,386,214 A 1/1995 Sugawara
5,387,886 A 2/1995 Takalo
5,394,162 A 2/1995 Korovesis et al.
RE34,898 E 4/1995 Turunen
5,408,206 A 4/1995 Turunen
5,418,508 A 5/1995 Puurunen
5,432,489 A 7/1995 Yrjola
5,438,697 A 8/1995 Fowler et al.
5,440,315 A 8/1995 Wright et al.
5,442,366 A 8/1995 Sanford
5,444,453 A 8/1995 Lalezari
5,467,065 A 11/1995 Turunen
5,473,295 A 12/1995 Turunen
5,506,554 A 4/1996 Ala-Kojola
5,508,668 A 4/1996 Prokkola
5,517,683 A 5/1996 Collett et al.
5,521,561 A 5/1996 Yrjola
5,532,703 A 7/1996 Stephens et al.
5,541,560 A 7/1996 Turunen
5,541,617 A 7/1996 Connolly et al.
5,543,764 A 8/1996 Turunen
5,550,519 A 8/1996 Korpela
5,557,287 A 9/1996 Pottala et al.
5,557,292 A 9/1996 Nygren et al.
5,570,071 A 10/1996 Ervasti
5,585,771 A 12/1996 Ervasti
5,585,810 A * 12/1996 Tsuru et al. .................. 343/745
5,589,844 A 12/1996 Belcher et al.
5,594,395 A 1/1997 Niiranen
5,604,471 A 2/1997 Rattila
5,627,502 A 5/1997 Ervasti
5,649,316 A 7/1997 Prodhomme et al.
5,668,561 A 9/1997 Perrotta et al.
5,675,301 A 10/1997 Nappa
5,689,221 A 11/1997 Niiranen
5,694,135 A 12/1997 Dikun et al.
5,703,600 A 12/1997 Burrell et al.
5,709,823 A 1/1998 Hayes et al.
5,711,014 A 1/1998 Crowley et al.
5,717,368 A 2/1998 Niiranen
5,731,749 A 3/1998 Yrjola
5,734,305 A 3/1998 Ervasti
5,734,350 A 3/1998 Deming et al.
5,734,351 A 3/1998 Ojantakanen
5,739,735 A 4/1998 Pyykko
5,742,259 A 4/1998 Annamaa
5,757,327 A 5/1998 Yajima et al.
5,764,190 A 6/1998 Murch et al.
5,767,809 A 6/1998 Chuang et al.
5,768,217 A 6/1998 Sonoda et al.
5,777,581 A 7/1998 Lilly et al.
5,777,585 A 7/1998 Tsuda et al.
5,793,269 A 8/1998 Ervasti
5,812,094 A 9/1998 Maldonado
5,815,048 A 9/1998 Ala-Kojola
5,822,705 A 10/1998 Lehtola
5,852,421 A 12/1998 Maldonado
5,861,854 A 1/1999 Kawahata et al.
5,874,926 A 2/1999 Tsuru et al.
5,880,697 A 3/1999 McCarrick et al.
5,886,668 A 3/1999 Pedersen et al.
5,892,490 A 4/1999 Asakura et al.
5,903,820 A 5/1999 Hagstrom
5,905,475 A 5/1999 Annamaa
5,920,290 A 7/1999 McDonough et al.
5,926,139 A 7/1999 Korisch
5,929,813 A 7/1999 Eggleston
5,936,583 A 8/1999 Tadahiko et al.
5,943,016 A 8/1999 Snyder, Jr. et al.
5,952,975 A 9/1999 Pedersen et al.
5,959,583 A 9/1999 Funk
5,963,180 A 10/1999 Leisten
5,966,097 A 10/1999 Fukasawa et al.
5,970,393 A 10/1999 Khorrami et al.
5,977,710 A 11/1999 Kuramoto et al.
5,986,606 A 11/1999 Kossiavas et al.
5,986,608 A 11/1999 Korisch et al.
5,990,838 A * 11/1999 Burns et al. .................. 343/702
5,990,848 A 11/1999 Annamaa
5,999,132 A 12/1999 Kitchener et al.
6,005,529 A 12/1999 Hutchinson
6,006,419 A 12/1999 Vandendolder et al.
6,008,764 A 12/1999 Ollikainen 6,009,311 A 12/1999 Killion et al.
6,009,316 A * 12/1999 Tsuji .......................... 455/277.1
6,014,106 A 1/2000 Annamaa
6,016,130 A 1/2000 Annamaa
6,023,608 A 2/2000 Yrjola
6,031,496 A 2/2000 Kuittinen et al.
6,034,637 A 3/2000 McCoy et al.
6,037,848 A 3/2000 Alila
6,043,780 A 3/2000 Funk et al.
6,072,434 A 6/2000 Papatheodorou
6,078,231 A 6/2000 Pelkonen
6,091,363 A 7/2000 Komatsu et al.
6,097,345 A 8/2000 Walton
6,100,849 A * 8/2000 Tsubaki et al. ............... 343/702
6,133,879 A 10/2000 Grangeat et al.
6,134,421 A 10/2000 Lee et al.
6,140,973 A 10/2000 Annamaa
6,147,650 A 11/2000 Kawahata et al.
6,157,819 A 12/2000 Vuokko
6,177,908 B1 * 1/2001 Kawahata et al. ..... 343/700 MS
6,185,434 B1 2/2001 Hagstrom
6,190,942 B1 2/2001 Wilm et al.
6,195,049 B1 2/2001 Kim et al.
6,204,826 B1 3/2001 Rutkowski et al.
6,215,376 B1 4/2001 Hagstrom
6,246,368 B1 6/2001 Deming et al.
6,252,552 B1 6/2001 Tarvas et al.
6,252,554 B1 6/2001 Isohatala
6,255,994 B1 7/2001 Saito
6,268,831 B1 7/2001 Sanford
6,297,776 B1 10/2001 Pankinaho
6,297,777 B1 * 10/2001 Tsubaki et al. ........ 343/700 MS
6,300,909 B1 * 10/2001 Tsubaki et al. ........ 343/700 MS
6,304,220 B1 10/2001 Herve et al.
6,308,720 B1 10/2001 Modi
6,316,975 B1 11/2001 O'Toole et al.
6,323,811 B1 11/2001 Tsubaki
6,326,921 B1 12/2001 Egorov et al.
6,337,663 B1 1/2002 Chi-Minh
6,340,954 B1 1/2002 Annamaa et al.
6,342,859 B1 1/2002 Kurz et al.
6,346,914 B1 2/2002 Annamaa
6,348,892 B1 2/2002 Annamaa
6,353,443 B1 3/2002 Ying
6,366,243 B1 4/2002 Isohatala
6,377,827 B1 4/2002 Rydbeck
6,380,905 B1 4/2002 Annamaa
6,396,444 B1 5/2002 Goward et al.
6,404,394 B1 6/2002 Hill
6,417,813 B1 7/2002 Durham
6,423,915 B1 7/2002 Winter
6,429,818 B1 8/2002 Johnson et al.
6,433,745 B1 * 8/2002 Nagumo et al. ....... 343/700 MS
6,452,551 B1 9/2002 Chen
6,452,558 B1 9/2002 Saitou et al.
6,456,249 B1 9/2002 Johnson et al.
6,459,413 B1 10/2002 Tseng et al.
6,462,716 B1 10/2002 Kushihi
6,469,673 B2 10/2002 Kaiponen
6,473,056 B2 10/2002 Annamaa
6,476,769 B1 11/2002 Lehtola
6,480,155 B1 11/2002 Eggleston
6,498,586 B2 * 12/2002 Pankinaho ............. 343/700 MS
6,501,425 B1 * 12/2002 Nagumo et al. ....... 343/700 MS
6,515,629 B1 * 2/2003 Kuo et al. .............. 343/700 MS
6,515,630 B2 * 2/2003 Honda .......................... 343/702
6,518,925 B1 2/2003 Annamaa
6,529,168 B2 3/2003 Mikkola
6,535,170 B2 3/2003 Sawamura et al.
6,538,604 B1 3/2003 Isohatala
6,549,167 B1 4/2003 Yoon
6,556,812 B1 4/2003 Pennanen et al.
6,566,944 B1 5/2003 Pehlke
6,580,396 B2 6/2003 Lin
6,580,397 B2 6/2003 Lindell
6,600,449 B2 7/2003 Onaka
6,603,430 B1 8/2003 Hill et al.
6,606,016 B2 8/2003 Takamine et al.
6,611,235 B2 8/2003 Barna et al.
6,614,400 B2 9/2003 Egorov
6,614,405 B1 9/2003 Mikkonen
6,633,261 B2 * 10/2003 Iwai et al. .............. 343/700 MS
6,634,564 B2 10/2003 Kuramochi
6,636,181 B2 10/2003 Asano
6,639,564 B2 10/2003 Johnson
6,642,907 B2 * 11/2003 Hamada et al. ............... 343/873
6,646,606 B2 11/2003 Mikkola
6,650,295 B2 * 11/2003 Ollikainen et al. .... 343/700 MS
6,657,593 B2 * 12/2003 Nagumo et al. ....... 343/700 MS
6,657,595 B1 12/2003 Phillips et al.
6,664,926 B1 * 12/2003 Zinanti et al. .......... 343/700 MS
6,670,926 B2 12/2003 Miyasaka
6,677,903 B2 1/2004 Wang
6,683,573 B2 1/2004 Park
6,693,594 B2 * 2/2004 Pankinaho et al. .... 343/700 MS
6,717,551 B1 4/2004 Desclos et al.
6,720,924 B2 * 4/2004 Tomomatsu et al. .. 343/700 MS
6,720,925 B2 * 4/2004 Wong et al. ............ 343/700 MS
6,727,857 B2 4/2004 Mikkola
6,734,825 B1 5/2004 Guo et al.
6,734,826 B1 5/2004 Dai et al.
6,738,022 B2 5/2004 Varjakka
6,741,214 B1 5/2004 Kadambi et al.
6,753,813 B2 * 6/2004 Kushihi ................. 343/700 MS
6,759,989 B2 7/2004 Tarvas et al.
6,765,536 B2 7/2004 Phillips et al.
6,774,853 B2 8/2004 Wong et al.
6,781,545 B2 8/2004 Sung
6,801,166 B2 10/2004 Mikkola
6,801,169 B1 10/2004 Chang et al.
6,806,835 B2 10/2004 Iwai
6,819,287 B2 11/2004 Sullivan et al.
6,819,293 B2 11/2004 Johannes et al.
6,825,818 B2 11/2004 Toncich
6,836,249 B2 12/2004 Kenoun et al.
6,847,329 B2 1/2005 Ikegaya et al.
6,856,293 B2 2/2005 Bordi
6,862,437 B1 3/2005 McNamara
6,862,441 B2 3/2005 Ella
6,873,291 B2 3/2005 Aoyama
6,876,328 B2 * 4/2005 Adachi et al. .......... 343/700 MS
6,876,329 B2 4/2005 Milosavljevic
6,882,317 B2 4/2005 Koskiniemi
6,891,507 B2 5/2005 Kushihi et al.
6,897,810 B2 5/2005 Dai et al.
6,900,768 B2 5/2005 Iguchi et al.
6,903,692 B2 6/2005 Kivekes et al.
6,911,945 B2 6/2005 Korva
6,922,171 B2 7/2005 Annamaa
6,925,689 B2 8/2005 Folkmar
6,927,792 B1 8/2005 Legay
6,937,196 B2 8/2005 Korva
6,950,066 B2 9/2005 Hendler et al.
6,950,068 B2 9/2005 Bordi
6,952,144 B2 10/2005 Javor
6,952,187 B2 10/2005 Annamaa
6,958,730 B2 10/2005 Nagumo et al.
6,961,544 B1 11/2005 Hagstrom
6,963,308 B2 11/2005 Korva
6,963,310 B2 11/2005 Horita et al.
6,967,618 B2 11/2005 Ojantakanen
6,975,278 B2 12/2005 Song et al.
6,985,108 B2 1/2006 Mikkola
6,992,543 B2 1/2006 Luetzelschwab et al.
6,995,710 B2 2/2006 Sugimoto et al.
7,023,341 B2 4/2006 Stilp
7,031,744 B2 4/2006 Kuriyama et al.
7,034,752 B2 * 4/2006 Sekiguchi et al. ..... 343/700 MS
7,042,403 B2 5/2006 Colburn et al.
7,053,841 B2 5/2006 Ponce De Leon et al.
7,054,671 B2 5/2006 Kaiponen et al.
7,057,560 B2 * 6/2006 Erkocevic ............. 343/700 MS
7,081,857 B2 7/2006 Kinnunen
7,084,831 B2 8/2006 Takagi et al.
7,099,690 B2 * 8/2006 Milosavljevic ............ 455/552.1
7,113,133 B2 9/2006 Chen et al.
7,119,749 B2 10/2006 Miyata et al.
7,126,546 B2 10/2006 Annamaa

| | | | | |
|---|---|---|---|---|
| 7,136,019 | B2 * | 11/2006 | Mikkola et al. | 343/702 |
| 7,136,020 | B2 | 11/2006 | Leclerc et al. | |
| 7,142,824 | B2 | 11/2006 | Kojima et al. | |
| 7,148,847 | B2 | 12/2006 | Yuanzhu | |
| 7,148,849 | B2 | 12/2006 | Lin | |
| 7,148,851 | B2 * | 12/2006 | Takaki et al. | 343/702 |
| 7,170,464 | B2 | 1/2007 | Tang et al. | |
| 7,176,838 | B1 | 2/2007 | Kinezos | |
| 7,176,841 | B2 * | 2/2007 | Fukuda | 343/745 |
| 7,180,455 | B2 | 2/2007 | Oh et al. | |
| 7,180,463 | B2 * | 2/2007 | Chung | 343/824 |
| 7,193,574 | B2 | 3/2007 | Chiang et al. | |
| 7,205,942 | B2 | 4/2007 | Wang et al. | |
| 7,218,280 | B2 | 5/2007 | Annamaa | |
| 7,218,282 | B2 | 5/2007 | Humpfer et al. | |
| 7,224,313 | B2 | 5/2007 | McKinzie, III et al. | |
| 7,230,574 | B2 | 6/2007 | Johnson | |
| 7,237,318 | B2 | 7/2007 | Annamaa | |
| 7,256,743 | B2 * | 8/2007 | Korva | 343/702 |
| 7,259,719 | B2 * | 8/2007 | Horie et al. | 343/700 MS |
| 7,274,334 | B2 | 9/2007 | O'Riordan et al. | |
| 7,283,097 | B2 | 10/2007 | Wen et al. | |
| 7,289,064 | B2 | 10/2007 | Cheng | |
| 7,292,200 | B2 | 11/2007 | Posluszny et al. | |
| 7,319,432 | B2 | 1/2008 | Andersson | |
| 7,330,153 | B2 | 2/2008 | Rentz | |
| 7,333,067 | B2 | 2/2008 | Hung et al. | |
| 7,339,528 | B2 | 3/2008 | Wang et al. | |
| 7,340,286 | B2 | 3/2008 | Korva | |
| 7,345,634 | B2 * | 3/2008 | Ozkar et al. | 343/702 |
| 7,352,326 | B2 * | 4/2008 | Korva et al. | 343/700 MS |
| 7,358,902 | B2 | 4/2008 | Erkocevic | |
| 7,385,556 | B2 | 6/2008 | Chung et al. | |
| 7,385,558 | B2 * | 6/2008 | Krupa | 343/702 |
| 7,388,543 | B2 | 6/2008 | Vance | |
| 7,391,378 | B2 | 6/2008 | Mikkola | |
| 7,405,702 | B2 | 7/2008 | Annamaa | |
| 7,417,588 | B2 | 8/2008 | Castany et al. | |
| 7,423,592 | B2 | 9/2008 | Pros et al. | |
| 7,432,860 | B2 | 10/2008 | Huynh | |
| 7,439,929 | B2 | 10/2008 | Ozkar | |
| 7,468,700 | B2 * | 12/2008 | Milosavlejevic | 343/702 |
| 7,468,709 | B2 | 12/2008 | Niemi | |
| 7,501,983 | B2 | 3/2009 | Mikkola | |
| 7,502,598 | B2 | 3/2009 | Kronberger | |
| 7,589,678 | B2 | 9/2009 | Perunka | |
| 7,616,158 | B2 | 11/2009 | Mark et al. | |
| 7,633,449 | B2 | 12/2009 | Oh | |
| 7,663,551 | B2 | 2/2010 | Nissinen | |
| 7,679,565 | B2 * | 3/2010 | Sorvala | 343/700 MS |
| 7,692,543 | B2 | 4/2010 | Copeland | |
| 7,710,325 | B2 | 5/2010 | Cheng | |
| 7,724,204 | B2 | 5/2010 | Annamaa | |
| 7,760,146 | B2 | 7/2010 | Ollikainen | |
| 7,764,245 | B2 | 7/2010 | Loyet | |
| 7,786,938 | B2 | 8/2010 | Sorvala | |
| 7,800,544 | B2 | 9/2010 | Thornell-Pers | |
| 7,830,327 | B2 | 11/2010 | He | |
| 7,889,139 | B2 | 2/2011 | Hobson et al. | |
| 7,889,143 | B2 * | 2/2011 | Milosavljevic et al. | 343/722 |
| 7,901,617 | B2 | 3/2011 | Taylor | |
| 7,916,086 | B2 | 3/2011 | Koskiniemi | |
| 7,963,347 | B2 | 6/2011 | Pabon | |
| 7,973,720 | B2 | 7/2011 | Sorvala | |
| 8,049,670 | B2 | 11/2011 | Jung et al. | |
| 8,179,322 | B2 | 5/2012 | Nissinen | |
| 2001/0050636 | A1 | 12/2001 | Weinberger | |
| 2002/0044092 | A1 | 4/2002 | Kushihi | |
| 2002/0163470 | A1 | 11/2002 | Naguma et al. | |
| 2002/0183013 | A1 | 12/2002 | Auckland et al. | |
| 2002/0196192 | A1 | 12/2002 | Nagumo et al. | |
| 2003/0146873 | A1 | 8/2003 | Blancho | |
| 2004/0066336 | A1 | 4/2004 | DeGraauw et al. | |
| 2004/0075614 | A1 | 4/2004 | Dakeya et al. | |
| 2004/0090378 | A1 | 5/2004 | Dai et al. | |
| 2004/0145525 | A1 | 7/2004 | Annabi et al. | |
| 2004/0171403 | A1 | 9/2004 | Mikkola | |
| 2004/0251984 | A1 | 12/2004 | Javor et al. | |
| 2005/0057401 | A1 | 3/2005 | Yuanzhu | |
| 2005/0159131 | A1 | 7/2005 | Shibagaki et al. | |
| 2005/0176481 | A1 | 8/2005 | Jeong | |
| 2006/0071857 | A1 | 4/2006 | Pelzer | |
| 2007/0042615 | A1 | 2/2007 | Liao | |
| 2007/0082789 | A1 | 4/2007 | Nissila | |
| 2007/0152881 | A1 | 7/2007 | Chan | |
| 2007/0159399 | A1 | 7/2007 | Perunka et al. | |
| 2007/0268190 | A1 | 11/2007 | Huynh et al. | |
| 2007/0273606 | A1 | 11/2007 | Mak et al. | |
| 2008/0055164 | A1 | 3/2008 | Zhang et al. | |
| 2008/0059106 | A1 | 3/2008 | Wight | |
| 2008/0088511 | A1 | 4/2008 | Sorvala | |
| 2008/0266199 | A1 | 10/2008 | Milosavljevic | |
| 2008/0303729 | A1 | 12/2008 | Milosavljevic et al. | |
| 2009/0009415 | A1 | 1/2009 | Tanska | |
| 2009/0135066 | A1 | 5/2009 | Raappana | |
| 2009/0174604 | A1 | 7/2009 | Keskitalo | |
| 2009/0196160 | A1 | 8/2009 | Crombach | |
| 2010/0220016 | A1 | 9/2010 | Nissinen | |
| 2010/0244978 | A1 | 9/2010 | Milosavljevic | |
| 2010/0309092 | A1 | 12/2010 | Lambacka | |
| 2011/0102290 | A1 | 5/2011 | Milosavljevic | |
| 2011/0133994 | A1 | 6/2011 | Korva | |
| 2012/0119955 | A1 | 5/2012 | Milosavljevic | |

FOREIGN PATENT DOCUMENTS

| | | | |
|---|---|---|---|
| DE | 10104862 | | 8/2002 |
| DE | 101 50 149 | A1 | 4/2003 |
| EP | 0208424 | | 1/1987 |
| EP | 0278069 | | 8/1988 |
| EP | 0279050 | | 8/1988 |
| EP | 0339822 | | 3/1989 |
| EP | 0 332 139 | | 9/1989 |
| EP | 0 376 643 | A2 | 4/1990 |
| EP | 0383292 | | 8/1990 |
| EP | 0399975 | | 12/1990 |
| EP | 0400872 | | 12/1990 |
| EP | 0401839 | | 9/1991 |
| EP | 0447218 | | 9/1994 |
| EP | 0615285 | | 10/1994 |
| EP | 0621653 | | 2/1995 |
| EP | 0 749 214 | | 12/1996 |
| EP | 0637094 | | 1/1997 |
| EP | 0 759 646 | A1 | 2/1997 |
| EP | 0 766 341 | | 2/1997 |
| EP | 0 766 340 | | 4/1997 |
| EP | 0751043 | | 4/1997 |
| EP | 0766339 | | 4/1997 |
| EP | 0807988 | | 11/1997 |
| EP | 0 831 547 | A2 | 3/1998 |
| EP | 0851830 | | 7/1998 |
| EP | 0856907 | | 8/1998 |
| EP | 1 294 048 | | 1/1999 |
| EP | 0892459 | | 1/1999 |
| EP | 0 942 488 | A2 | 9/1999 |
| EP | 1 003 240 | A2 | 5/2000 |
| EP | 0999607 | | 5/2000 |
| EP | 1006605 | | 6/2000 |
| EP | 1006606 | | 6/2000 |
| EP | 1014487 | | 6/2000 |
| EP | 1024553 | | 8/2000 |
| EP | 1026774 | | 8/2000 |
| EP | 1 052 723 | | 11/2000 |
| EP | 1052722 | | 11/2000 |
| EP | 1 063 722 | A2 | 12/2000 |
| EP | 1067627 | | 1/2001 |
| EP | 1094545 | | 4/2001 |
| EP | 1 102 348 | | 5/2001 |
| EP | 1098387 | | 5/2001 |
| EP | 1 113 524 | | 7/2001 |
| EP | 1113524 | | 7/2001 |
| EP | 1 128 466 | A2 | 8/2001 |
| EP | 1 139 490 | | 10/2001 |
| EP | 1 146 589 | | 10/2001 |
| EP | 1 162 688 | | 12/2001 |
| EP | 1162688 | | 12/2001 |
| EP | 0993070 | | 4/2002 |
| EP | 1 248 316 | | 9/2002 |
| EP | 0923158 | | 9/2002 |

| | | | |
|---|---|---|---|
| EP | 1 267 441 | | 12/2002 |
| EP | 1271690 | | 1/2003 |
| EP | 1 294 049 | A1 | 3/2003 |
| EP | 1306922 | | 5/2003 |
| EP | 1 329 980 | | 7/2003 |
| EP | 1 351 334 | | 8/2003 |
| EP | 1 361 623 | | 11/2003 |
| EP | 1361623 | | 11/2003 |
| EP | 1248316 | | 1/2004 |
| EP | 1396906 | | 3/2004 |
| EP | 1 406 345 | | 4/2004 |
| EP | 1 414 108 | | 4/2004 |
| EP | 1 432 072 | | 6/2004 |
| EP | 1 437 793 | | 7/2004 |
| EP | 1439603 | | 7/2004 |
| EP | 1 445 822 | | 8/2004 |
| EP | 1 453 137 | | 9/2004 |
| EP | 1 469 549 | | 10/2004 |
| EP | 1220456 | | 10/2004 |
| EP | 1467456 | | 10/2004 |
| EP | 1 482 592 | | 12/2004 |
| EP | 1 498 984 | | 1/2005 |
| EP | 1 564 839 | | 1/2005 |
| EP | 1170822 | | 4/2005 |
| EP | 1 544 943 | | 6/2005 |
| EP | 1753079 | | 2/2007 |
| EP | 1 791 213 | | 5/2007 |
| EP | 1843432 | | 10/2007 |
| FI | 20020829 | | 11/2003 |
| FI | 2005/050247 | | 6/2005 |
| FI | 2006/050418 | | 4/2007 |
| FR | 2553584 | | 10/1983 |
| FR | 2873247 | | 1/2006 |
| GB | 2046530 | | 11/1980 |
| GB | 2266997 | | 11/1993 |
| GB | 2 360 422 | A | 9/2001 |
| GB | 239246 | | 12/2003 |
| JP | 114503 | | 7/1983 |
| JP | 52-215807 | | 12/1983 |
| JP | 52-215808 | | 12/1983 |
| JP | 69202831 | | 11/1984 |
| JP | 216601 | | 10/1985 |
| JP | 600206304 | | 10/1985 |
| JP | 101902 | | 6/1986 |
| JP | 134605 | | 7/1986 |
| JP | 61245704 | | 11/1986 |
| JP | 6007204 | | 1/1989 |
| JP | 03 280625 | | 12/1991 |
| JP | 06152463 | | 5/1994 |
| JP | 7131234 | | 5/1995 |
| JP | 7221536 | | 8/1995 |
| JP | 7249923 | | 9/1995 |
| JP | 07307612 | | 11/1995 |
| JP | 08216571 | | 8/1996 |
| JP | 09083242 | | 3/1997 |
| JP | 9260934 | | 10/1997 |
| JP | 9307344 | | 11/1997 |
| JP | 10 028013 | | 1/1998 |
| JP | 10107671 | | 4/1998 |
| JP | 10173423 | | 6/1998 |
| JP | 100173423 | | 6/1998 |
| JP | 10 209733 | | 8/1998 |
| JP | 10224142 | | 8/1998 |
| JP | 10 327011 | | 12/1998 |
| JP | 10322124 | | 12/1998 |
| JP | 11 004117 | | 1/1999 |
| JP | 114113 | | 1/1999 |
| JP | 11 068456 | | 3/1999 |
| JP | 11127010 | | 5/1999 |
| JP | 11127014 | | 5/1999 |
| JP | 11136025 | | 5/1999 |
| JP | 11 355033 | | 12/1999 |
| JP | 2000278028 | | 10/2000 |
| JP | 200153543 | | 2/2001 |
| JP | 2001267833 | | 9/2001 |
| JP | 2001217631 | | 10/2001 |
| JP | 2001326513 | | 11/2001 |
| JP | 2002319811 | | 10/2002 |
| JP | 2002319811 | A | 10/2002 |
| JP | 2002329541 | | 11/2002 |
| JP | 2002335117 | | 11/2002 |
| JP | 200360417 | | 2/2003 |
| JP | 2003124730 | | 4/2003 |
| JP | 2003179426 | | 6/2003 |
| JP | 2003318638 | | 11/2003 |
| JP | 2004112028 | | 4/2004 |
| JP | 2004363859 | | 12/2004 |
| JP | 2005005985 | | 1/2005 |
| JP | 2005252661 | | 9/2005 |
| KR | 20010080521 | | 8/2001 |
| KR | 10-2006-7027462 | | 12/2002 |
| KR | 20020096016 | | 12/2002 |
| SE | 511900 | | 12/1999 |
| WO | WO 92/00635 | | 1/1992 |
| WO | WO 96/27219 | | 9/1996 |
| WO | WO 98/01919 | | 1/1998 |
| WO | WO 98/01921 | | 1/1998 |
| WO | WO 98/37592 | | 8/1998 |
| WO | WO 99/30479 | | 6/1999 |
| WO | WO 00/34916 | | 6/2000 |
| WO | WO 00/36700 | | 6/2000 |
| WO | WO 01/20718 | | 3/2001 |
| WO | WO 01/24316 | | 4/2001 |
| WO | WO 01/28035 | | 4/2001 |
| WO | WO 01/29927 | | 4/2001 |
| WO | WO 01/33665 | | 5/2001 |
| WO | WO 01/61781 | | 8/2001 |
| WO | WO 01/91236 | | 11/2001 |
| WO | WO 02/08672 | | 1/2002 |
| WO | WO 02/11236 | A1 | 2/2002 |
| WO | WO 02/13307 | | 2/2002 |
| WO | WO 02/41443 | | 5/2002 |
| WO | WO 02/067375 | | 8/2002 |
| WO | WO 02/078123 | | 10/2002 |
| WO | WO 02/078124 | | 10/2002 |
| WO | WO 03/094290 | | 11/2003 |
| WO | WO 2004/017462 | | 2/2004 |
| WO | WO 2004/036778 | | 4/2004 |
| WO | WO 2004/057697 | | 7/2004 |
| WO | WO 2004/070872 | | 8/2004 |
| WO | WO 2004/100313 | | 11/2004 |
| WO | WO 2004/112189 | | 12/2004 |
| WO | WO 2004/112189 | A | 12/2004 |
| WO | 2005011055 | | 2/2005 |
| WO | WO 2005/011055 | | 2/2005 |
| WO | WO 2005/0180456 | | 2/2005 |
| WO | WO 2005/034286 | | 4/2005 |
| WO | WO 2005/038981 | | 4/2005 |
| WO | WO 2005/038981 | A1 | 4/2005 |
| WO | WO 2005/055364 | | 6/2005 |
| WO | WO 2005/062416 | | 7/2005 |
| WO | WO 2006/000631 | A1 | 1/2006 |
| WO | WO 2006/000650 | | 1/2006 |
| WO | WO 2006/051160 | A1 | 5/2006 |
| WO | WO 2006/084951 | A1 | 8/2006 |
| WO | WO 2006/097567 | | 9/2006 |
| WO | WO 2007/000483 | | 1/2007 |
| WO | WO 2007/000483 | A1 | 1/2007 |
| WO | WO 2007/012697 | | 1/2007 |
| WO | WO 2007/012697 | | 2/2007 |
| WO | WO 2007/039667 | | 4/2007 |
| WO | WO 2007/039668 | | 4/2007 |
| WO | WO 2007/042614 | | 4/2007 |
| WO | WO 2007/042615 | | 4/2007 |
| WO | WO 2007/050600 | | 5/2007 |
| WO | WO 2007/080214 | | 7/2007 |
| WO | WO 2007/09881 | | 9/2007 |
| WO | WO 2007/138157 | | 12/2007 |
| WO | WO 2008/059106 | | 3/2008 |
| WO | WO 2008/129125 | | 10/2008 |
| WO | WO 2009/027579 | | 5/2009 |
| WO | WO 2009/095531 | | 8/2009 |
| WO | WO 2009/106682 | | 9/2009 |

OTHER PUBLICATIONS

"Dual Band Antenna for Hand Held Portable Telephones", Liu et al., Electronics Letters, vol. 32, No. 7, 1996, pp. 609-610.

"Improved Bandwidth of Microstrip Antennas using Parasitic Elements," IEE Proc. vol. 127, Pt. H. No. 4, Aug. 1980.
"Transactions on Antennas and Propagation," IEEE vol. 43, No. 3, Mar, 1995.
"A 13.56MHz RFID Device and Software for Mobile Systems", by H. Ryoson, at al., Micro Systems Network Co., 2004 IEEE, pp. 241-244.
"A Novel Approach of a Planar Multi-Band Hybrid Series Feed Network for Use in Antenna Systems Operating at Millimeter Wave Frequencies," by M.W. Elsallal and B.L. Hauck, Rockwell Collins, Inc., 2003 pp. 15-24, waelsall@rockwellcollins.com and blhauck@rockwellcollins.com.
A Finnish Search Report, dated Sep. 18, 2003, which issued during the prosecution of Finnish Application No. 20030059 which corresponds to the present application.
A Finnish Search Report, dated Sep, 18, 2003, which issued during the prosecution of Finnish Application No. 20030059 which corresponds to the present application.
A Finnish Search Report, dated Sep. 23, 2003, which issued during the prosecution of Finnish Application No. 20030093 which corresponds to the present application.
A Finnish Search Report, dated Sep. 26, 2003, which issued during the prosecution of Finnish Application No. 20030193 which corresponds to the present application.
Abedin, M. F. And M. Ali, \Modifying the ground plane and its elDect on planar inverted-F antennas (PIFAs) for mobile handsets, IEEE Antennas and Wireless Propagation Letters, vol. 2, 226{229, 2001.
Balanis, C. A., "Antenna Theory Analysis and Design," John Wiley & Sons, Inc., 1997.
C. R. Rowell and R. D. Murch, "A compact PIFA suitable for dual frequency 900/1800-MHz operation," IEEE Trans. Antennas Propag., vol. 46, No. 4, pp. 596-598, Apr. 1998.
Cheng- Nan Hu, Willey Chen, and Book Tai, "A Compact Multi-Band Antenna Design for Mobile Handsets", APMC 2005 Proceedings.
Endo, T., Y. Sunahara, S. Satoh and T. Katagi, "Resonant Frequency and Radiation Efficiency of Meander Line Antennas," Electronics and Commu-nications in Japan, Part 2, vol. 83, No. 1, 52-58, 2000.
European Office Action, May 30, 2005 issued during prosecution of EP 04 396 001.Feb. 1248.
Examination Report dated May 3, 2006 issued by the EPO for European Patent Application No. 04 396 079.8.
F.R. Hsiao, et al. "A dual-band planar inverted-F patch antenna with a branch-line slit," *Microwave Opt. Technol. Lett.*, vol. 32, Feb. 20, 2002.
Front page of EP 1024553 A2, which corresponds to US Patent Publication No. 2001/0050636 A1 listed above.
Front page of EP 1026774 A3, which corresponds to US Patent Publication No. 2001/0050635 A1 listed above.
Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.
Guo, Y. X. and H. S. Tan, \New compact six-band internal antenna, *IEEE Antennas and Wireless Propagation Letters*, vol. 3, 295-297, 2004.
Guo, Y. X. and Y.W. Chia and Z. N. Chen, "Miniature built-in quadband antennas for mobile handsets", *IEEE Antennas Wireless Propag. Lett.*, vol. 2, pp. 30-32, 2004.
Hoon Park, et al. "Design of an Internal antenna with wide and multiband characteristics for a mobile handset", *IEEE Microw. & Opt. Tech. Lett.* vol 48, No. 5, May 2006.
Hoon Park, et al. "Design of Planar Inverted-F Antenna With Very Wide Impedance Bandwidth", *IEEE Microw, & Wireless Comp., Lett.*, vol. 16, No. 3, pp. 113-115-, Mar. 2006.
Hossa, R., A. Byndas, and M. E. Bialkowski, \Improvement of compact internal antenna performance by incorporating open-end slots in ground plane, *IEEE Microwave and Wireless Components Letters*, vol. 14, 283{285, 2004.
I. Ang, Y. X. Guo, and Y. W. Chia, "Compact internal quad-band antenna for mobile phones" *Micro. Opt. Technol. Lett.*, vol. 38, No. 3 pp. 217-223 Aug. 2003.
International Preliminary Report on Patentability for International Application No. PCT/FI2004/000554, date of issuance of report May 1, 2006.
Jing, X., et al.; "Compact Planar Monopole Antenna for Multi-Band Mobile Phones"; Microwave Conference Proceedings, 4.-7.12.2005. APMC 2005, Asia- Pacific Conference Proceedings, vol. 4.
Kim, B. C., J. H. Yun, and H. D. Choi, \Small wideband PIFA for mobile phones at 1800 MHz, *IEEE International Conference on Vehicular Technology*, 27{29, Daejeon, South Korea, May 2004.
Kim, Kihong et al., "Integrated Dipole Antennas on Silicon Substrates for Intra-Chip Communication", IEEE, pp. 1582-1585, 1999.
Kivekas., O., J. Ollikainen, T. Lehtiniemi, and P. Vainikainen, \Bandwidth, SAR, and e±ciency of internal mobile phone antennas, *IEEE Transactions on Electromagnetic Compatibility*, vol. 46, 71{86, 2004.
K-L Wong, *Planar Antennas for Wireless Communications*, Hoboken, NJ: Willey, 2003, ch. 2.
Kunz, K. S., R. J. Ruebbers, "The Finite Differ-ence Time Domain Method for Electromagnetics", CRC Press, 1993.
Lindberg., P. and E. Ojefors, \A bandwidth enhancement technique for mobile handset antennas using wavetraps, *IEEE Transactions on Antennas and Propagation*, vol. 54, 2226{2232, 2006.
Marta Martinez- Vazquez, et al., "Integrated Planar Multiband Antennas for Personal Communication Handsets", *IEEE Transactions on Antennas and propogation*, vol. 54, No. 2, Feb. 2006.
Matthaei et al., Microwave Filters, Impedance—Mathing Networks and Coupling Structures, McGraw-Hill, pp. 497-506 & 733-737 (1964).
Mobile antenna Systems Handbook, $2^{nd}$ ed., K. Fujimoto and R.J. James, Eds., Artech House, Norwood, MA, 2001.
Nagle, High Frequency Diversity Receiver From the 1930's, Ham Radio, pp. 34-43 (Apr. 1990).
0. Kivekäs, et al.; "Frequency-tunable internal antenna for mobile phones", Proceedings of 12émes Journées Internationales de Nice sur les Antennes, $12^{th}$ Int'l Symposium on Antennas (JINA 2002), vol. 2, 2002, Nice, France, s.53-56, tiivistelmä.
P. Ciais, et al., "Compact Internal Multiband Antennas for Mobile and WLAN Standards", *Electronic Letters*, vol. 40, No. 15, pp. 920-921, Jul. 2004.
P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.
P. Salonen, et al. "New slot configurations for dual-band planar inverted-F antenna," *Microwave Opt. Technol.*, vol. 28, pp. 293-298, 2001.
Papapolymerou, loannis et al., "Micromachined Patch Antennas", IEEE Transactions on Antennas and Propagation, vol. 46, No. 2, pp. 275-283, Feb. 1998.
Park, J. D., N. Kim, "SAR Analysis on Human Head Caused by PCS Handheld Telephone," BEMS 21th Annual. Meeting, 166-167, 1999.
Patent Abstracts of Japan, vol. 1999, No. 10, Aug. 31, 1999, Application JP 11 127010 (Sony Corp.).
Patent Abstracts of Japan—vol. 12, No. 106 (E-14 596)(2953) Apr. 6, 1988 & JP-A-62 235 801 (Fuji Electrochem Co. Ltd.) Oct. 16, 1987.
Patent Abstracts of Japan—vol. 14, No. 297, (E-945) Jun. 27, 1990 & JP-A-2-094 901 (Toko Inc.) Apr. 5, 1990.
Patent Abstracts of Japan—vol. 5, No. 11 (E-42)(683) Jan. 23, 1981 & JP-A-55 141 802 (Alps Denki K.K.) Nov. 6, 1980.
Patent Abstracts of Japan—vol. 7, No. 292 (E-219)(1437) Dec. 27, 1983 & JP-A-58-168 302 (Fujitsu K.K.) Oct. 4, 1983.
Product of the Month, RFDesign, "GSM/GPRS Quad Band Power Amp Includes Antenna Switch," 1 page, reprinted Nov. 2004 issue of RF Design (www.rfdesign.com), Copyright 2004, Freescale Semiconductor, RFD-24-EK.
Q.-H. Jin, S.-S Dai, and K,-M. Huang, Microwave chemistry, Science Press, Beijing, 1999.
0,-H. Jin, S.-S Dai, and K.-M. Huang, Microwave chemistry, Science Press, Beijing, 1999.
S. Tarvas, et al. "An internal dual-band mobile phone antenna," in *2000 IEEE Antennas Propagat Soc. Int. Symp. Dig.*, pp. 266-269, Salt Lake City, UT, USA.

Wang, F., Z. Du, Q. Wang, and K. Gong, \Enhanced-bandwidth PIFA with T-shaped ground plane, *Electronics Letters*, vol. 40, 1504{1505, 2004.

Wang, H.; "Dual-Resonance Monopole Antenna with Tuning Stubs"; IEEE Proceedings, Microwaves, Antennas & Propagation, vol. 153, No. 4, Aug. 2006; pp. 395-399.

Wong, K, et al.; "A Low-Profile Planar Monopole Antenna for Multiband Operation of Mobile Handsets"; IEEE Transactions on Antennas and Propagation, Jan. 2003, vol. 51, No. 1.

X.-D. Cal and J.Y. Li, Analysis of asymmetric Tem cell and its optimum design of electric field distribution, IEE Proc 136 (1989), 191-194.

X.-Q. Yang and K.-M. Huang, Study on the key problems of interaction between microwave and chemical reaction, Chin Jof Radio Sci 21 (2006), 802-809.

X.-Q. Yang and K.-M, Huang, Study on the key problems of interaction between microwave and chemical reaction, Chin Jof Radio Sci 21 (2006), 802-809,.

Ying-Xin Guo, Irene Ang., and M. Y. W. Chia, "Compact Internal Multiband Antennas for Mobile Handsets", *IEEE Antennas and Wireless propagation Letters*, vol. 2, pp. 143-146, 2003.

Yong-Xin Guo, et al. "New Compact Six-Band Internal Antenna," *IEEE Antennas and Wireless Propagation Letters*, vol. 3, pp. 295-297, 2004.

Z.-B. Zhang, L.-X. Zhou, Y.-R. Li, C.-H. Yan, and M. Zhang, The synthesis of diphenylthiourea under irradiation of different frequency microwave, J Yangzhou Univ (Natural Science Edition), 3 (2000), 14-16.

* cited by examiner

ADJUSTABLE ANTENNA AND METHODS

PRIORITY AND RELATED APPLICATIONS

This application is a continuation of prior International PCT Application No. PCT/FI2006/050418 entitled “Adjustable antenna” having an international filing date of Sep. 28, 2006, which claims priority to Finland Patent Application No. 20065116 of the same title filed Feb. 15, 2006, as well as Finland Patent Application No. 20055554 filed Oct. 14, 2005, each of the foregoing incorporated herein by reference in its entirety. This application is related to co-owned and co-pending U.S. patent application Ser. No. 12/083,129 filed Apr. 3, 2008 entitled “Multiband Antenna System And Methods”, Ser. No. 12/080,741 filed Apr. 3, 2008 entitled “Multiband Antenna System and Methods”, Ser. No. 12/082,514 filed Apr. 10, 2008 entitled “Internal Antenna and Methods”, Ser. No. 12/009,009 filed Jan. 15, 2008 and entitled “Dual Antenna Apparatus And Methods”, Ser. No. 11/544,173 filed Oct. 5, 2006 and entitled “Multi-Band Antenna With a Common Resonant Feed Structure and Methods”, and co-owned and co-pending U.S. patent application Ser. No. 11/603,511 filed Nov. 22, 2006 and entitled “Multiband Antenna Apparatus and Methods”, each also incorporated herein by reference in its entirety. This application is also related to co-owned and co-pending U.S. patent application Ser. Nos. 11/648,429 filed Dec. 28, 2006 and entitled “Antenna, Component And Methods”, and 11/648,431 also filed Dec. 28, 2006 and entitled “Chip Antenna Apparatus and Methods”, both of which are incorporated herein by reference in their entirety. This application is further related to U.S. patent application Ser. Nos. 11/901,611 filed Sep. 17, 2007 entitled “Antenna Component and Methods”, 11/883,945 filed Aug. 6, 2007 entitled “Internal Monopole Antenna”, 11/801,894 filed May 10, 2007 entitled “Antenna Component”, and 11/922,976 entitled “Internal multiband antenna and methods” filed Dec. 28, 2007, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

The invention relates to an adjustable antenna especially intended for mobile terminals.

BACKGROUND OF THE INVENTION

The adjustability of an antenna means in this description that a resonance frequency of the antenna can be changed electrically. The aim is that the operating band of the antenna around the resonance frequency always covers the frequency range, which the function presumes at each time. There are different causes for the need for adjustability. As portable radio devices, like mobile terminals, are becoming smaller thickness-wise, too, the distance between the radiating plane and the ground plane of an internal planar antenna unavoidably becomes shorter. This results in e.g. that the antenna bandwidths will decrease. Then, as a mobile terminal is intended for operating in a plurality of radio systems having frequency ranges relatively close to each other, it becomes more difficult or impossible to cover frequency ranges used by more than one radio system. Such a system pair is for instance GSM1800 and GSM1900 (Global System for Mobile telecommunications). Correspondingly, securing the function that conforms to specifications in both transmitting and receiving bands of a single system can become more difficult. If the system uses sub-band division, it is advantageous, from the point of view of the radio connection quality, if the resonance frequency of the antenna can be tuned in a sub-band being used at each time.

In the invention described here the antenna adjusting is implemented by a switch. The use of switches for the purpose in question is well known as such. For example the publication EP1 113 524 discloses an antenna, where a planar radiator can at a certain point be connected to the ground by a switch. When the switch is closed, the electric length of the radiator is decreased, in which case the antenna resonance frequency becomes higher and the operating band corresponding to the resonance frequency is displaced upwards. A capacitor can be in series with the switch to set the band displacement as large as desired. In this solution the adjusting possibilities are very limited.

In FIG. 1 there is a solution including a switch, known from the publication EP 1 544 943. Of the antenna base structure, only the radiator 120 is drawn in the figure, which radiator can be a part of a larger radiating plane. The antenna comprises, in addition to the base structure, an adjusting circuit with a parasitic element 131, a transmission line 132, a two-way switch 133, a first reactive circuit X1 and a second reactive circuit X2. The head end of the first conductor of the transmission line is connected to the parasitic element, and the head end of the second conductor is connected to the ground. In practice, the second conductor can belong to the ground plane, which as such has no head and tail end. Each reactive circuit includes for example two or three reactive components. The transmission line 132 will be terminated, depending on the switch state, by one of the reactive circuits. When the switch is controlled so that its state changes, the electric length and resonance frequency of a certain part of the antenna change. This means that the corresponding operating band is displaced.

The solution according to FIG. 1 is intended for a multiband antenna. In it the influence of the adjusting can be directed, when needed, only on one operating band of the antenna, and a good impedance matching can be arranged for the antenna in the band to be displaced. These matters are due to that there are several variables when designing the adjusting circuit. However, the solution is suitable only for the antennas of PIFA type, and the parasitic element used in it increases the structure costs.

SUMMARY OF THE INVENTION

In a first aspect of the invention, an antenna of monopole type is disclosed. In one embodiment, the antenna comprises an adjusting circuit to change its resonance frequency and thus the place of its operating band. In this case the operating band covers at a time only a part of a frequency range used by one or two radio systems. The adjusting circuit is located between the radiator and the antenna port/switch of a radio device and forms, together with the antenna feed conductor, a feed circuit. This circuit comprises an adjustable reactance between the feed conductor and the ground or in series with the feed conductor or in both of those places. For example, the feed conductor can be connected by a multiple-way switch to one of alternative transmission lines, which are typically short-circuited or open at their tail end and shorter than the quarter wave, each line acting for a certain reactance. The lengths of the transmission lines and the values of the possible discrete components then are variables from the point of view of the antenna adjusting.

An advantage of this exemplary embodiment of the invention is that the space required for an antenna according to it is very small due to the monopole structure. Despite its small size, a basic antenna having a relatively narrow band functions in practice as a broad band antenna, because only a part of this broad band is needed at a time. In addition, a good matching and efficiency are achieved over the whole width of the band, because the matching of a relatively narrowband antenna can be arranged more comfortably than of a real broadband antenna. A further advantage of this exemplary embodiment of the invention is that the space required for the adjusting circuit of the antenna is relatively small. This is due in part to physically short transmission lines in the adjusting circuit. A still further advantage of the invention is that the adjusting according to it does not require arrangement of a coupling to the antenna radiator, which means a simpler antenna structure and thus savings in production costs.

In another aspect of the invention, an adjustable antenna is disclosed. In one embodiment, the antenna comprises: a radiator electrically coupled to an adjusting circuit, said adjusting circuit comprising a plurality of reactive circuits disposed between a feed conductor and a signal ground. Each of said plurality of reactive circuits generates a unique resonance frequency for said antenna.

In one variant, the antenna further comprises an antenna switch, said antenna switch implementing time divisional sharing between a plurality of transmit/receive components. The plurality of transmit/receive components comprise for example a first transmitter and receiver for a first system, and a second transmitter and receiver for a second, different system.

In another variant, said adjusting circuit further comprises at least one switch coupled to said plurality of reactive circuits, said at least one switch electrically coupled to a control feed. Signals received via said control feed trigger said at least one switch to change states thereby selecting one of said plurality reactive circuits.

In yet another variant, said at least one switch comprises two switches disposed in electrical series with one another, said two switches enabling at least four reactive circuits between said feed conductor and said signal ground. For example, the at least four reactive circuits comprise a plurality of inductive and a plurality of capacitive electronic components.

In a further variant, said at least one switch comprises a first and a second state, said first and second states characterized by a first and a second electronic component, respectively, said first and second electronic components disposed in electrical parallel with one another.

In still another variant, said adjusting circuit comprises a phase shifter and a capacitance diode, said plurality of reactive circuits generated via adjustments generated by a control signal to said capacitance diode.

In another aspect of the invention, a method of operating an adjustable antenna is disclosed. In one embodiment, the adjustable antenna comprises an adjusting circuit, a radiator and a feed conductor electrically coupling said adjusting circuit to said radiator, and said method comprises: operating said adjusting circuit in a first mode of operation, said first mode of operation associated with a first resonance frequency; receiving a control signal at said adjusting circuit to change states; and operating said adjusting circuit in a second mode of operation, said second mode of operation associated with a second resonance frequency.

In one variant, the adjustable antenna further comprises an antenna switch coupled between a plurality of transmit/receive nodes, and said method further comprises: operating said antenna switch such that it time-shares between said plurality of transmit/receive nodes.

In another aspect of the invention, an adjusting circuit useful in an antenna system is disclosed. In one embodiment, said adjusting circuit comprises a plurality of reactive circuits disposed between a feed conductor and a signal ground. Each of said plurality of reactive circuits generates a unique resonance frequency for said antenna.

In one variant, said adjusting circuit further comprises at least one switch coupled to said plurality of reactive circuits, said at least one switch electrically coupled to a control feed. The signals received via said control feed trigger said at least one switch to change states, thereby controllably selecting one of said plurality reactive circuits.

In another variant, said at least one switch comprises two switches disposed in electrical series with one another, said two switches enabling at least four distinct reactive circuits between said feed conductor and said signal ground.

In a further variant, said at least four reactive circuits comprise a plurality of inductive and a plurality of capacitive electronic components.

In yet another variant, said at least one switch comprises a first and a second state, said first and second states characterized by a first and a second electronic component, respectively, said first and second electronic components disposed in electrical parallel with one another.

In a further variant, said adjusting circuit comprises a phase shifter and a capacitance diode, said plurality of reactive circuits generated via adjustments generated by a control signal to said capacitance diode.

In yet another aspect of the invention, an adjustable antenna comprising a signal ground, monopole radiator having a feed conductor and an adjusting circuit to displace an operating band of the antenna, wherein the adjusting circuit and feed conductor together form a feed circuit of the antenna, the feed circuit comprising a reactive circuit between the feed conductor and the signal ground and at least one node pair, the reactance of a circuit between the nodes of which pair can be altered to change a resonance frequency of the antenna.

In one variant, the number of said node pairs is one, one node of said pair being located at the feed conductor, and the other node of said pair being located in the signal ground, the circuit between the nodes of said pair comprises at least two inductive elements and a multiple-way switch to comprise a connection between the feed conductor and signal ground through one inductive element at a time. The inductive elements comprise for example short transmission lines. In one variant, the number of said transmission lines is three, and the operating bands corresponding thereto collectively substantially cover a frequency range at least 100 MHz wide.

In another variant, the frequency range comprises a range of approximately 470-702 MHz associated with a DVB-H system.

In yet another variant, said inductive elements comprise discrete coils.

In still a further variant, the number of said node pairs is one, each node of said pair being located at the feed conductor, the circuit between the nodes of said pair being disposed in series with the feed conductor and comprising at least two capacitive elements and a multiple-way switch to constitute a connection between the nodes through one capacitive element at a time, said reactive circuit comprising a fixedly connected coil.

In yet another variant, said at least one node pair comprises two node pairs, one node of a first of said node pairs being disposed at the feed conductor and the other node of said first pair being disposed at least partly in the signal ground, a circuit between the nodes of said first pair comprising at least two inductive elements and a multiple-way switch to form a connection between the feed conductor and signal ground through one inductive element at a time, and each node of a second pair of said two node pairs being disposed substantially at the feed conductor, the circuit between said second pair of nodes being disposed in electrical series with the feed conductor and comprising at least two capacitive elements and a multiple-way switch to form a connection between the nodes of said second pair through one of said capacitive elements at a time.

In a further variant, wherein the number of said node pairs is one, one node of said pair being located substantially at the feed conductor and the other node of said pair being associated with the signal ground, and said circuit between the nodes comprising (i) a capacitance diode to change the reactance of the circuit, and (ii) a phase shifter to shift the adjustment range of the reactance of the circuit.

In yet another variant, the adjusting circuit further comprises an LC circuit disposed electrically between the feed conductor and said switch to at least protect the switch against electrostatic discharge.

In still another variant, said switch is selected from the group consisting of FET, PHEMT or MEMS devices.

In a further variant, said antenna comprises an inverted L antenna (ILA).

BRIEF DESCRIPTION OF THE DRAWINGS

The invention is below described in detail. Reference will be made to the accompanying drawings where.

DETAILED DESCRIPTION OF THE INVENTION

Reference is now made to the drawings wherein like numerals refer to like parts throughout.

Figure 1:
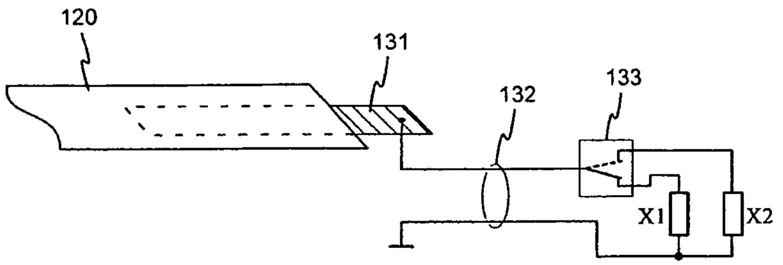
Fig. 1 PRIOR ART
FIG. 1 presents an example of an adjustable antenna according to the prior art.

FIG. 1 was already described in conjunction with the description of the prior art.

Figure 2:
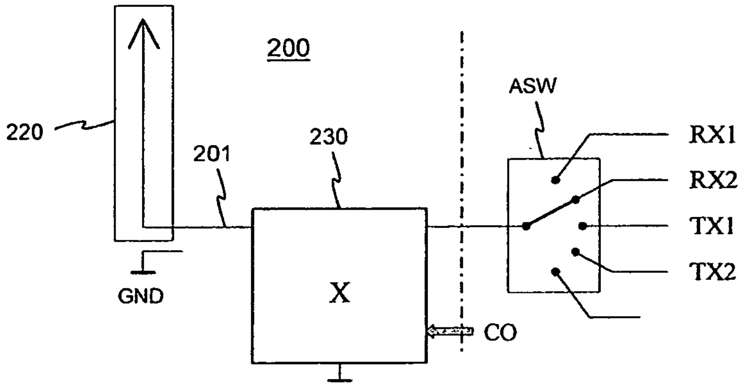
FIG. 2 presents a principled structure of an antenna according to the invention.

FIG. 2 shows the principled structure of an antenna according to the invention as a simple block diagram. The radiator 220 of an antenna 200 is of monopole type. Also the feed conductor 201 and the adjusting circuit 230 of the antenna are here included in the antenna. Naturally also the common signal ground GND, necessary in the function of the structure, belongs to it. The feed conductor has been connected to the radiator at its one end and to the rest of the radio device in question at its other end. In the example of FIG. 2 the radio device has the transmitters TX1, TX2 and receivers RX1, RX2 in compliance with two different systems, and its function is time divisional. For this reason the feed conductor is connected the transmitters and receivers through the antenna switch ASW. The adjusting circuit 230 engages the feed conductor 201 and forms together with it a feed circuit. The adjusting circuit is reactive by nature to avoid losses, and it receives a control CO from the radio device. A reactance value influencing in the circuit is altered by that control so that a resonance frequency of the antenna and along with it the place of an operating band change as desired.

There is at least one node pair in the feed circuit, the reactance between which nodes can be altered by the control CO. One node of the pair is located along the feed conductor, and the other node can be located in the signal ground or at another point of the feed conductor. In the latter case the reactance to be altered is in series with the feed conductor. In all cases there is a reactive circuit, adjustable or constant, between the feed conductor and signal ground. Examples of the feed circuit are in FIGS. 3-6.

Figure 3:
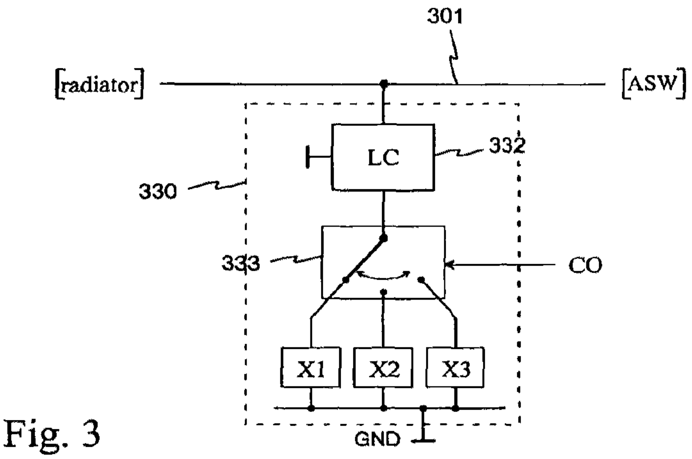
FIG. 3 presents as a block diagram an example of an adjusting circuit of an antenna according to the invention.

In FIG. 3 there is as a block diagram an adjusting circuit according to the invention, where the adjusting circuit 330 has been connected between the antenna feed conductor 301 and the signal ground GND. The adjusting circuit comprises an LC circuit 332, a multiple-way switch 333 and three alternative reactive structure parts X1, X2, X3. The LC circuit has been connected to the feed conductor at its one end and to the switch input at its other end. Its aim is to attenuate the harmonic frequency components being generated in the switch and to function as an electrostatic discharge (ESD) protector of the switch. The switch 333 has three outputs, to one of which the switch input can be connected at a time by the control CO. Each output of the switch has been fixedly connected to one of said reactive structure parts, the reactances of which exist against the signal ground. The interchanging of the reactance by controlling the switch changes the resonance frequency of the antenna and thus the place of its operating band. The operating band of the antenna then has three alternative places in this example.

Figure 4:
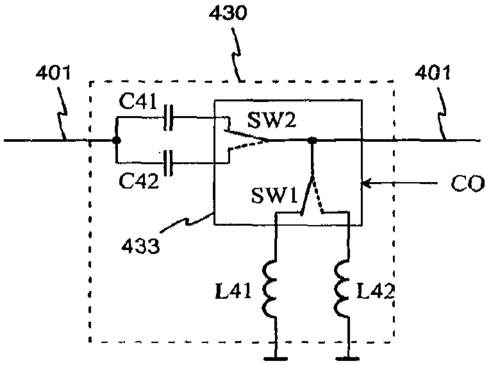
FIG. 4 presents another example of an adjusting circuit of an antenna according to the invention.

In FIG. 4 there is a feed circuit according to the invention, the adjusting circuit 430 of which comprises a part between the feed conductor 401 and the signal ground and another part in series with the feed conductor. The former part is located before the latter part, as seen from the antenna port/switch. Both parts are adjustable in this example. The part between the feed conductor and signal ground comprises a two-way switch SW1 and two inductive structure parts L41 and L42. Depending on the state of the switch SW1, one of the inductive structure parts L41, L42 is connected from the feed conductor to the signal ground. The part in series comprises another two-way switch SW2 and two capacitive structure parts C41 and C42. Depending on the state of the switch SW2, one of the capacitive structure parts C41, C42 is connected in series with the feed conductor 401. The two-way switches SW1 and SW2 together form a switching unit 433, which is controlled by the control signals CO. If the controls of the two-way switches are distinct, four alternative places are in principle obtained for the antenna operating band.

Figure 5:
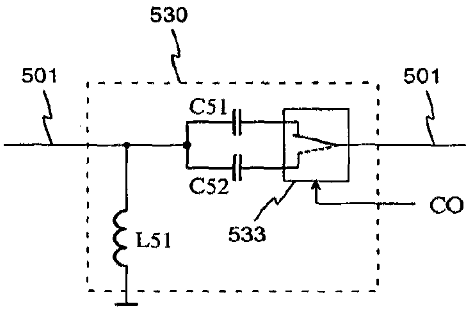
FIG. 5 presents a third example of an adjusting circuit of an antenna according to the invention.

In FIG. 5 there is a feed circuit according to the invention, the adjusting circuit 530 of which comprises a part between the feed conductor 501 and the signal ground and another part in series with the feed conductor. The former part is located after the latter part, as seen from the antenna port/switch, and only the part in series is adjustable. The part between the feed conductor and signal ground consists of an inductive structure part L51. The part in series comprises a two-way switch 533 and two capacitive structure parts C51 and C52. Depending on the state of the switch 533, one of the capacitive structure parts C51, C52 is connected in series with the feed conductor 501. The switch is controlled by the control signal CO. In this case the antenna operating band has two alternative places.

The inductive structure part can be located at antenna port's side of the part in series with the feed conductor instead of the radiator's side of the part in series as presented in FIG. 5. Inside the part in series the order of the two-way switch and capacitive structure parts can be any, in other words the two-way switch can be located also at radiator's side of the capacitive structure parts.

Figure 6:
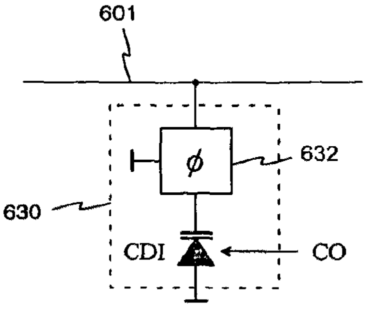
FIG. 6 presents a fourth example of an adjusting circuit of an antenna according to the invention.

In FIG. 6 there is a feed circuit according to the invention, the adjusting circuit 630 of which comprises only a part between the feed conductor 601 and the signal ground. That part consists of a phase shifter 632 and a capacitance diode CDI, which are in series. The adjustment takes place by controlling the capacitance diode by the control signal CO, which can be continuous in this example. The antenna operating band can then be displaced continuously in a defined total range. By designing the phase shifter suitably, the adjustment range of the reactance of the adjusting circuit can be shifted as desired. For example, it can be shifted wholly to the inductive side.

Figure 7:
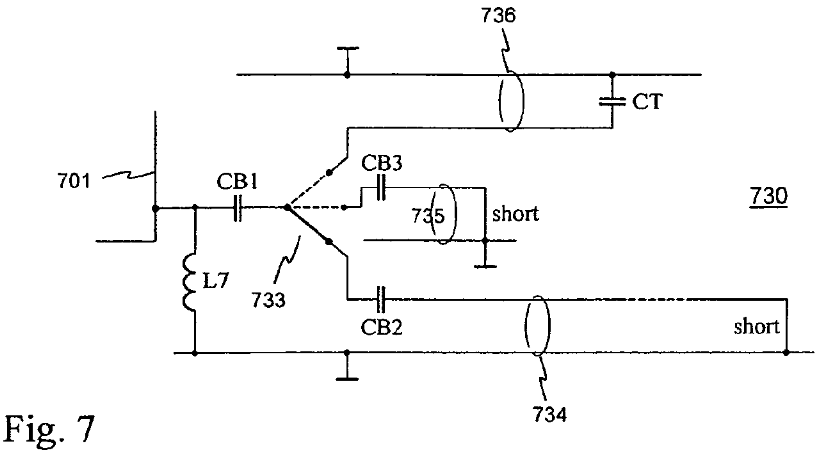
FIG. 7 presents as a circuit diagram an example of the implementation of an adjusting circuit according to FIG. 3.

FIG. 7 shows as a circuit diagram an example of the implementing of an adjusting circuit according to FIG. 3. Said LC circuit comprises a coil L7 connected between the input conductor of the adjusting circuit 730 and the signal ground and a capacitor CB1 in series with the input conductor of the adjusting circuit, which input conductor is connected to the antenna feed conductor 701. The capacitor CB1 functions also as a blocking capacitor preventing the forming of a direct current circuit through the antenna feed conductor as seen from the control circuit of the switch of the adjusting circuit. One terminal of the capacitor CB1 has been connected to the input of the switch 733. The reactive structure parts connected to the three outputs of the switch are implemented by short transmission lines, each of which comprising a ground conductor and another conductor insulated from the ground, which conductor is here called a separate conductor. An open transmission line shorter than the quarter wave represents a certain capacitance, and the short-circuited line represents a certain inductance. These transmission lines, which implement the alternative reactances, are called tuning lines. In this example the first tuning line 734 is short-circuited at its tail end, the second tuning line 735 is short-circuited as well at its tail end and the third tuning line 736 is terminated by a discrete tuning capacitor CT at its tail end. A blocking capacitor CB2 is at the head end of the separate conductor of the short-circuited first tuning line to prevent the forming of a direct current circuit through the tuning line and the control circuit of the switch. For same reason there is a blocking capacitor CB3 at the head end of the separate conductor of the second tuning line.

Figure 8:
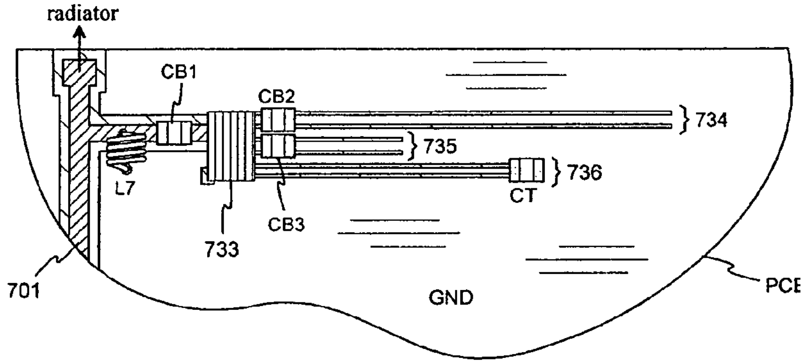
FIG. 8 presents an example of the implementation of the adjusting circuit according to FIG. 7 by a circuit board.

FIG. 8 shows an example of the implementation of the adjusting circuit according to FIG. 7 by a circuit board. The upper surface of the circuit board PCB is mostly conductive ground plane GND functioning as the signal ground. The feed conductor 701 of the antenna is a conductor strip on the surface of the circuit board continuing to a monopole radiator from an edge of the circuit board. The input conductor of the adjusting circuit is a conductor strip, which branches from the feed conductor. Said coil L7 and capacitor CB1 are discrete components. The switch 733 is an integrated component. The switching parts are type of FET (Field Effect Transistor), PHEMT (Pseudomorphic High Electron Mobility Transistor) or MEMS (Micro Electro Mechanical System), for example. The switch is controlled from the opposite side of the circuit board through a via. The tuning lines 734, 735, 736 are planar transmission lines on the surface of the circuit board. A short-circuited line is produced, when the tail end of the separate conductor of the line joins the surrounding ground plane.

Figure 9:
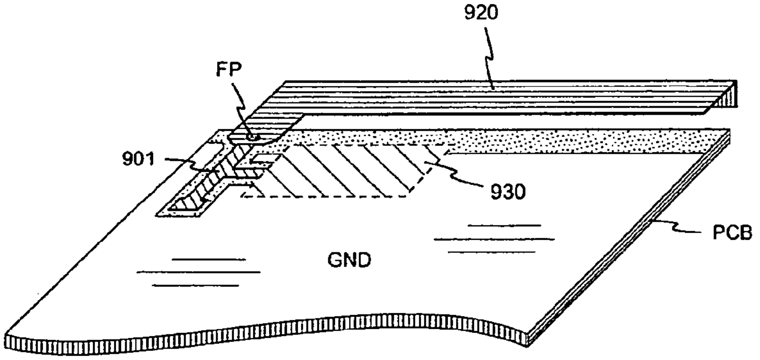
FIG. 9 presents an example of the wholeness of an antenna according to the invention.

FIG. 9 shows an example of the wholeness of an antenna according to the invention. A portion of the circuit board PCB of a radio device is seen in the figure. The monopole radiator 920 is a plate-like and rigid sheet metal strip. It has been connected to the antenna feed conductor 901 at the feed point FP being located near a corner of the circuit board. The radiator is directed first from that point over the edge of the end of the circuit board outside the board and turns after that, onwards level with the upper surface of the circuit board, in the direction of the end. On the circuit board there is the signal ground GND at a certain distance from the radiator 920. The antenna of the example is then an ILA (Inverted L-antenna), which is a version of the monopole antenna. The radiator has a perpendicular fold part at the outer edge of the portion along the end of the circuit board to increase its electric length. On the circuit board, in the end on the radiator side, there is the adjusting circuit 930 of the antenna. It has been presented only as an area confined by a broken line in FIG. 9.

Figure 10:
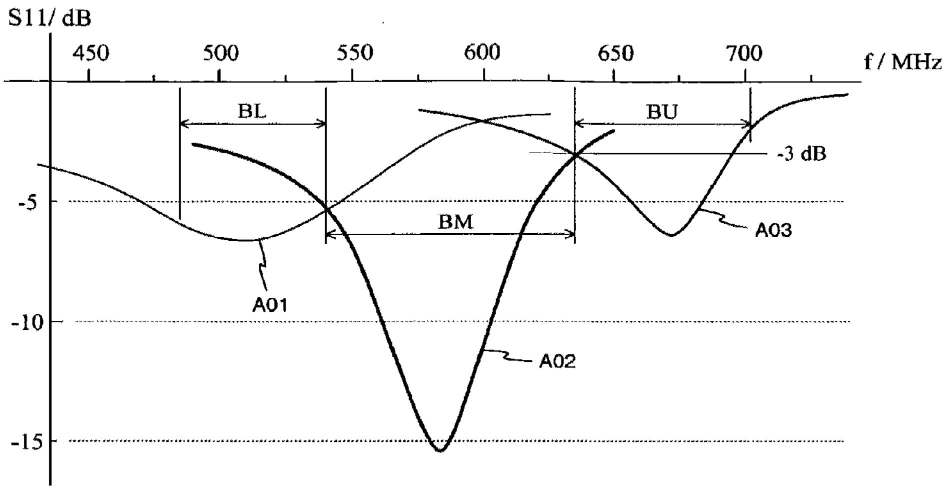
FIG. 10 presents an example of the displacement of an operating band of an antenna according to the invention, when the adjusting circuit is controlled.

FIG. 10 shows an example of the displacement of an operating band of an antenna according to the invention, when the adjusting circuit is controlled. The example relates to the antenna comprising an adjusting circuit according to FIG. 8. The first tuning line 734 of the antenna is 17 mm long, the second tuning line 735 is 1.5 mm long and the third tuning line 736 is 3.5 mm long. The capacitance of the tuning capacitor CT is 10 pF. The circuit board material is FR-4, the dielectric constant of which is about 4.5. The antenna has been designed for the DVB-H system (Digital Video Broadcasting), which uses the frequency range 470-702 MHz. Curve A01 shows fluctuation of the reflection coefficient as a function of frequency, when the feed conductor is connected to the first tuning line, curve A02 shows fluctuation of the reflection coefficient, when the feed conductor is connected to the second tuning line and curve A03 shows fluctuation of the reflection coefficient, when the feed conductor is connected to the third tuning line. From the curves can be seen that the above-mentioned frequency range will be covered so that the reflection coefficient is −3 dB or better apart from just the upper end of the range. The use of the first tuning line is most advantageous in the lower band BL, 470-540 MHz, the use of the second tuning line in the middle band BM, 540-635 MHz and the use of the third tuning line in the upper band BU, 635-702 MHz. The measured antenna with its adjusting circuit is a prototype and can be improved by a more accurate design.

Figure 11:
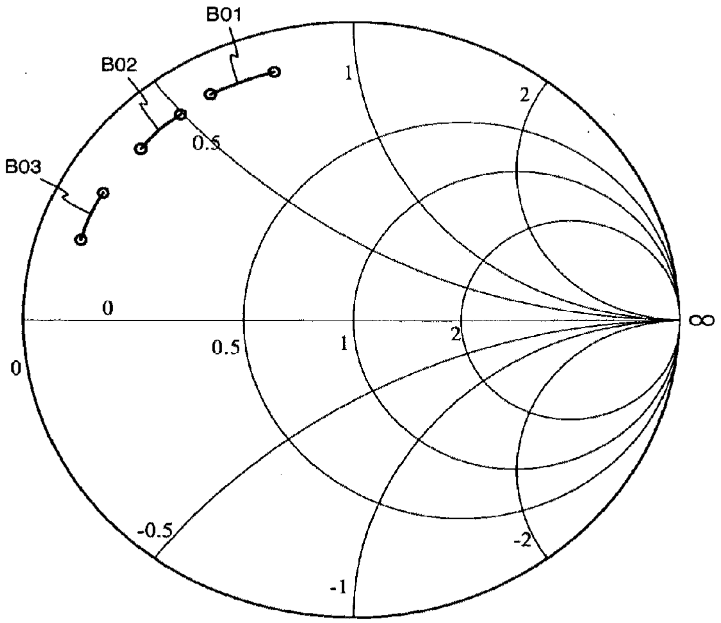
FIG. 11 presents as a Smith diagram an example of the impedance of an adjusting circuit of an antenna according to the invention.

FIG. 11 shows as a Smith diagram an example of the impedance of the adjusting circuit of an antenna according to the invention. The example relates to the same structure as the matching curves in FIG. 10. Curve B01 shows fluctuation of the impedance as a function of frequency, when the radiator is connected to the first tuning line, curve B02 shows fluctuation of the impedance, when the radiator is connected to the second tuning line and curve B03 shows fluctuation of the impedance, when the radiator is connected to the third tuning line. The ends of the curves correspond to the boundary frequencies of the above-mentioned bands BL, BM and BU. In an ideal case the curves would be situated on the outer circle of the diagram, which case would correspond to a lossless case. In practice the adjusting circuit is not lossless, of course. However, the resistive proportion of the impedances is small, order of 5O, when the characteristic impedance of the lines is 50O. It can be seen from the diagram that the impedance of all tuning lines is inductive. The third tuning line 736 would be capacitive as open, but terminating the line by the 10 pF capacitance converts it to slightly inductive. A corresponding short-circuited line would be so short that it would not function correctly in practice.

Figure 12:
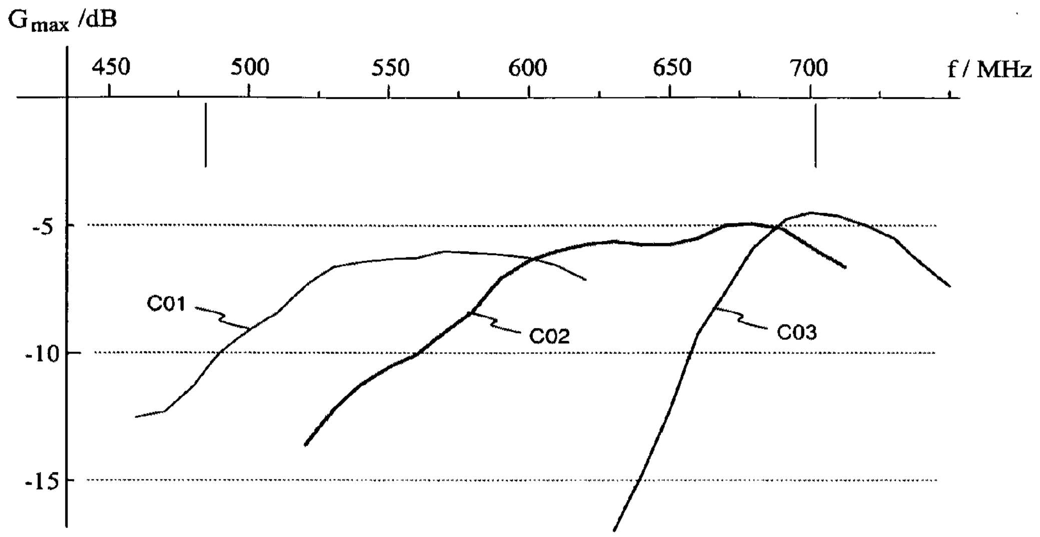
FIG. 12 presents an example of the gain of an antenna according to the invention.

FIG. 12 shows an example of the gain of an antenna according to the invention. It relates to the maximum gain $G_{max}$ or the gain in the most advantageous direction. The example concerns the same structure as the matching curves in FIG. 10. Curve C01 shows the fluctuation of the maximum gain as a function of frequency, when the radiator is connected to the first tuning line, curve C02 shows fluctuation of the maximum gain, when the radiator is connected to the second tuning line and curve C03 shows fluctuation of the maximum gain, when the radiator is connected to the third tuning line. It can be seen from the curves that the maximum gain fluctuates from −5 to −10 dB in most of the using range of each tuning line.

The adjustable monopole antenna according to the invention has been described above. Its structure can naturally differ in details from that presented. For example the number of the switch operating states and of the tuning lines or circuits corresponding those states can be also greater than three to implement more alternative places for the operating band. The reactive circuit from the feed conductor to the ground is advantageously inductive, but can also be capacitive. Correspondingly the possible series circuit is advantageously capacitive, but also can be inductive. The invention does not limit the manufacturing manner of the antenna radiator. The inventive idea can be applied in different ways within the scope defined by the independent claim 1.

The invention claimed is:

1. A method of operating an adjustable antenna, said adjustable antenna comprising an adjusting circuit, an antenna switch coupled between a plurality of transmit/receive nodes, a radiator and a feed conductor electrically coupling said adjusting circuit to said radiator, said method comprising:

operating said adjusting circuit in a first mode of operation, said first mode of operation associated with a first resonance frequency;

receiving a control signal at said adjusting circuit to change states;

operating said adjusting circuit in a second mode of operation, said second mode of operation associated with a second resonance frequency; and operating said antenna switch such that it time-shares between said plurality of transmit/receive nodes.

2. An adjustable antenna comprising:

a signal ground;

a monopole radiator having a feed conductor; and an adjusting circuit to displace an operating band of the antenna;

wherein:

the adjusting circuit and feed conductor together form a feed circuit of the antenna, the feed circuit comprising a reactive circuit between the feed conductor and the signal ground and at least one node pair, the reactance of a circuit between the nodes of each pair which can be altered to change a resonance frequency of the antenna; and said at least one node pair comprises two node pairs, one node of a first of said node pairs being disposed at the feed conductor and the other node of said first pair being disposed at least partly in the signal ground, a circuit between the nodes of said first pair comprising at least two inductive elements and a multiple-way switch to form a connection between the feed conductor and the signal ground through one inductive element at a time, and each node of a second pair of said two node pairs being disposed substantially at the feed conductor, the circuit between said second pair of nodes being disposed in electrical series with the feed conductor and comprising at least two capacitive elements and a multiple-way switch to form a connection between the nodes of said second pair through one of said capacitive elements at a time.

3. An adjustable antenna comprising a signal ground, monopole radiator having a feed conductor and an adjusting circuit to displace an operating band of the antenna, wherein the adjusting circuit and feed conductor together form a feed circuit of the antenna, the feed circuit comprising a reactive circuit between the feed conductor and the signal ground and two node pairs, the reactance of a circuit between the nodes of which pair can be altered to change a resonance frequency of the antenna;

wherein:

one node of a first of said node pairs is disposed at the feed conductor and the other node of said first pair is disposed at least partly in the signal ground;

a circuit between the nodes of said first pair comprises at least two inductive elements and a multiple-way switch to form a connection between the feed conductor and the signal ground through one inductive element at a time; and each node of a second pair of said two node pairs is disposed substantially at the feed conductor, the circuit between said second pair of nodes being disposed in electrical series with the feed conductor and comprising at least two capacitive elements and a multiple-way switch to form a connection between the nodes of said second pair through one of said capacitive elements at a time.

4. An adjustable antenna comprising a signal ground, monopole radiator having a feed conductor and an adjusting circuit to displace an operating band of the antenna, wherein the adjusting circuit and feed conductor together form a feed circuit of the antenna, the feed circuit comprising a reactive circuit between the feed conductor and the signal ground and at least two node pairs, the reactance of a circuit between the nodes of each pair can be altered to change a resonance frequency of the antenna;

wherein one node of a first of said node pairs being disposed at the feed conductor and the other node of said first pair being disposed at least partly in the signal ground, a circuit between the nodes of said first pair comprising at least two inductive elements and a multiple-way switch to form a connection between the feed conductor and the signal ground through one inductive element at a time, and each node of a second pair of said two node pairs being disposed substantially at the feed conductor, the circuit between said second pair of nodes being disposed in electrical series with the feed conductor and comprising at least two capacitive elements and a multiple-way switch to form a connection between the nodes of said second pair through one of said capacitive elements at a time.

5. An antenna according to claim 4, wherein said inductive elements comprise transmission lines.

6. An antenna according to claim 5, wherein the number of said transmission lines is three, and the operating bands corresponding thereto collectively substantially cover a frequency range at least 100 MHz wide.

7. An antenna according to claim 6, wherein the frequency range comprises a range of approximately 470-702 MHz associated with a DVB-H system.

8. An antenna according to claim 4, wherein said inductive elements comprise discrete coils.

9. An antenna according to claim 4, wherein the adjusting circuit further comprises an LC circuit disposed electrically between the feed conductor and said switch to at least protect the switch against electrostatic discharge.

10. An antenna according to claim 4, wherein said switch is selected from the group consisting of FET, PHEMT or MEMS devices.

11. An antenna according to claim 4, wherein said antenna comprises an inverted L antenna (ILA).

12. An adjustable antenna, comprising:

a radiator electrically coupled to an adjusting circuit, said adjusting circuit comprising a plurality of reactive circuits disposed between a feed conductor and a signal ground;

wherein each of said plurality of reactive circuits generates a unique resonance frequency for said antenna; and wherein said adjusting circuit is configured to select at east two alternate operating states of said antenna; and wherein said adjusting circuit further comprises at least one switch coupled to said plurality of reactive circuits, said at least one switch electrically coupled to a control feed;

wherein signals received via said control feed trigger said at least one switch to change states thereby selecting one of said plurality reactive circuits.

13. The adjustable antenna of claim 12, wherein said at least one switch comprises two switches disposed in electrical series with one another, said two switches enabling at least four reactive circuits between said feed conductor and said signal ground.

14. The adjustable antenna of claim 13, wherein said at least four reactive circuits comprise a plurality of inductive and a plurality of capacitive electronic components.

15. The adjustable antenna of claim 12, wherein said at least one switch comprises a first and a second state, said first and second states characterized by a first and a second electronic component, respectively, said first and second electronic components disposed in electrical parallel with one another.

* * * * *